United States Patent [19]
Zitzow et al.

[11] 3,950,752
[45] Apr. 13, 1976

[54] NAVIGATION RECEIVER SYSTEM FOR SYNCHRONIZING TO NOISY, ASYMMETRICAL SIGNALS

[75] Inventors: Harold P. Zitzow, Reading; Alan C. Marshall, Framingham, both of Mass.

[73] Assignee: EPSCO, Incorporated, Westwood, Mass.

[22] Filed: June 1, 1973

[21] Appl. No.: 366,023

[52] U.S. Cl. ........................... 343/105 R; 324/83 FE
[51] Int. Cl.² ........................................... G01S 1/30
[58] Field of Search .............. 343/105 R; 324/83 FE

[56] References Cited
UNITED STATES PATENTS
2,814,725   11/1957   Jacobs et al. ................... 324/83 FE
3,573,828   4/1971   Hawley ........................... 343/105 R
3,689,925   9/1972   Hulland........................... 343/105 R Primary Examiner—Maynard R. Wilbur
Assistant Examiner—Gregory E. Montone
Attorney, Agent, or Firm—Weingarten, Maxham & Schurgin

[57] ABSTRACT

In an Omega receiver a phase detection system operative on both rising and falling edges of a hard limited, received Omega signal to compensate for random noise and asymmetries in the hard limited signal.

6 Claims, 11 Drawing Figures

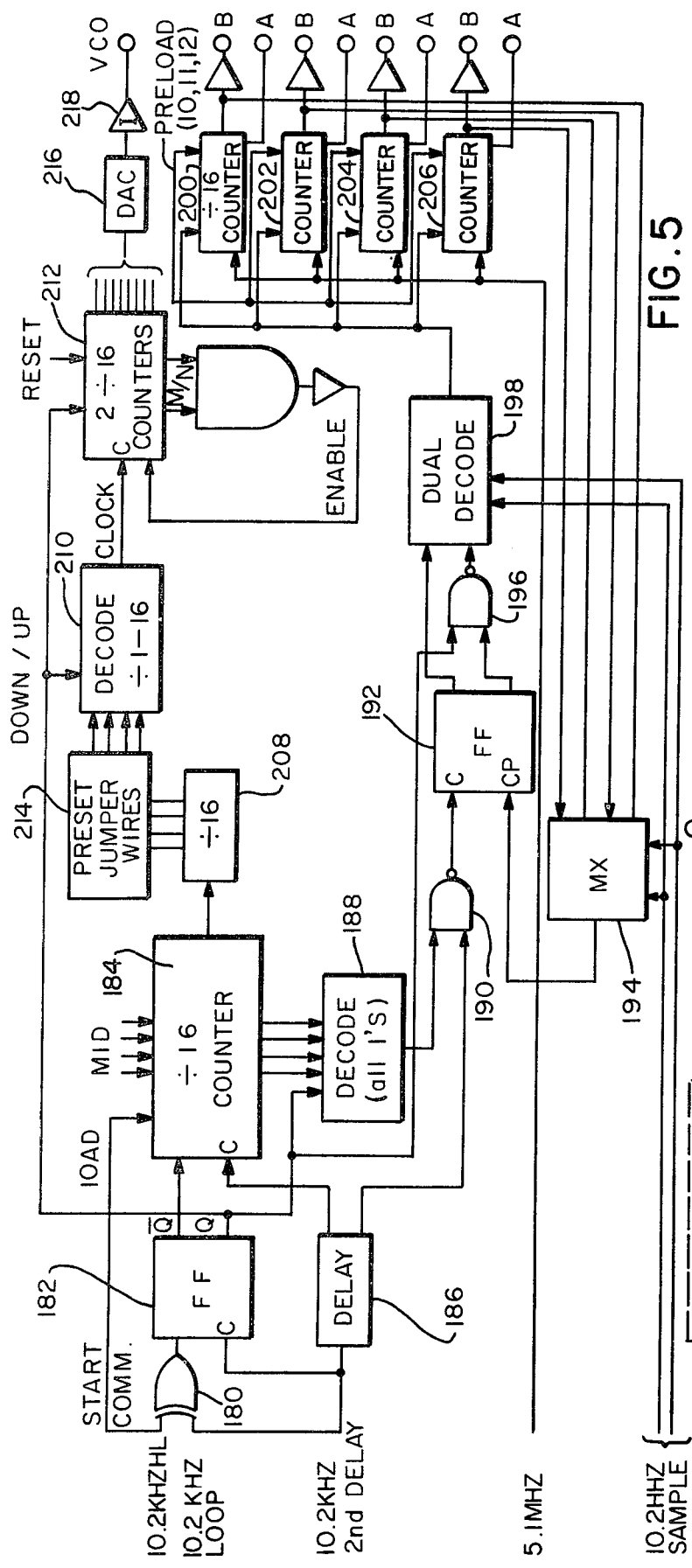
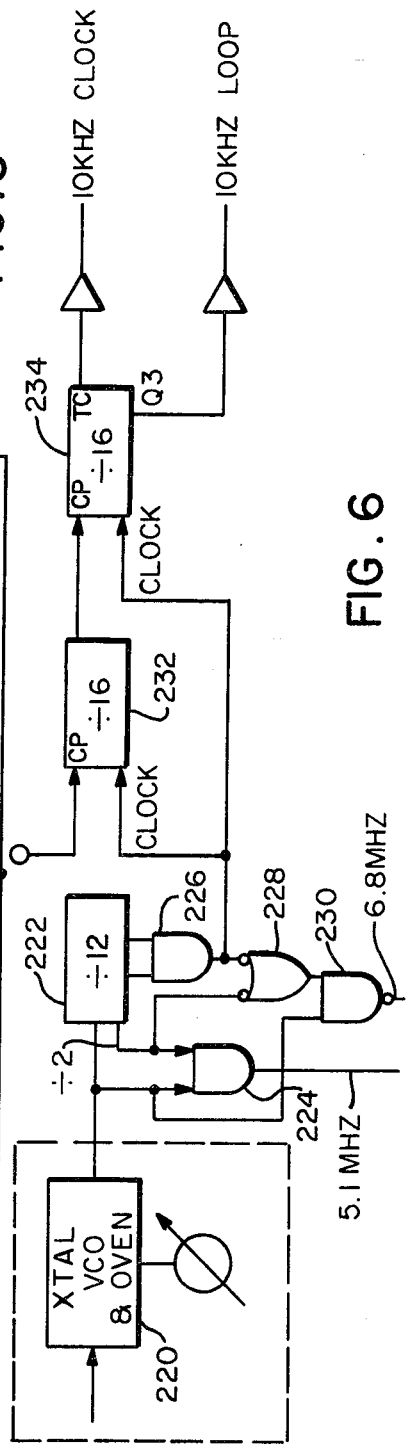
FIG. 5
FIG. 6

NAVIGATION RECEIVER SYSTEM FOR SYNCHRONIZING TO NOISY, ASYMMETRICAL SIGNALS

FIELD OF THE INVENTION

This invention relates to Omega navigation receivers and in particular to an improved phase detector for such receivers.

BACKGROUND OF THE INVENTION

The world-wide coverage offered by the eight ultimate Omega transmission stations operating in the low frequency range just above 10 $KH_z$ makes the Omega navigation system universally attractive. The basic theory of operation of an Omega navigation receiver is that several lines-of-position are calculated which place the receiver within one of several lanes which may be eight or more miles across. Knowing an initial position to define which lane is the correct position, it is possible to track vessel position by intersecting lines of position, even where lanes are changed, by accurately recording the changes in the vessel LOPs with time.

Each line-of-position within a lane results from determination of the phase difference between two Omega station transmissions as received at the vessel's position. It is thus necessary that at least three stations be provided in order to obtain two intersecting lines-of-position, although it is preferable to have four stations. The determination of the phase difference between received Omega transmissions is typically achieved by comparing zero crossing points of cycles of the received transmission. Because of variation in signal strength at the point of reception, it is desirable to amplify and hard limit the received signal so as to provide a generally squarewave signal. It has previously been important that the squarewave be accurately symmetrical in order to prevent errors from creeping into the detection of phase difference through variations in zero crossings. Hard limiters which are capable of this function are known, however, when faced with a dynamic range of, for example, 100 db over which the hard limiters must operate, it becomes expensive and difficult to achieve a symmetrical squarewave response to all possible signal strengths over that range.

BRIEF SUMMARY OF THE INVENTION

In accordance with the preferred embodiment of the present invention, an Omega navigation receiver is presented which employs a scheme for phase detection that eliminates the necessity for strict maintenance of symmetry in hard limiting of the received Omega signals.

In particular, the receiver of the present invention employs a phase detection system that synchronizes a tracking loop for each station received to alternate rising and falling zero crossings of the hard limited, received signal. When using such a system in combination with a known level of channel noise and even though substantial asymmetry is introduced, the tracking loops will be accurately synchronized to the same point on each corresponding received signal. This accurate maintenance of the tracking loop synchronization permits accurate detection of the phase difference between them and thus of the LOP.

BRIEF DESCRIPTION OF THE DRAWINGS

These and other features of the present invention will be fully set out below in the solely exemplary detailed description of the preferred embodiment and in the accompanying drawings of which:

FIG. 5 is a detailed presentation of the phase detection portion of the receiver;

FIG. 6 is a detailed description of the oscillator of the receiver and associated frequency division components;

DETAILED DESCRIPTION OF THE PREFERRED EMBODIMENT

Figure 1:
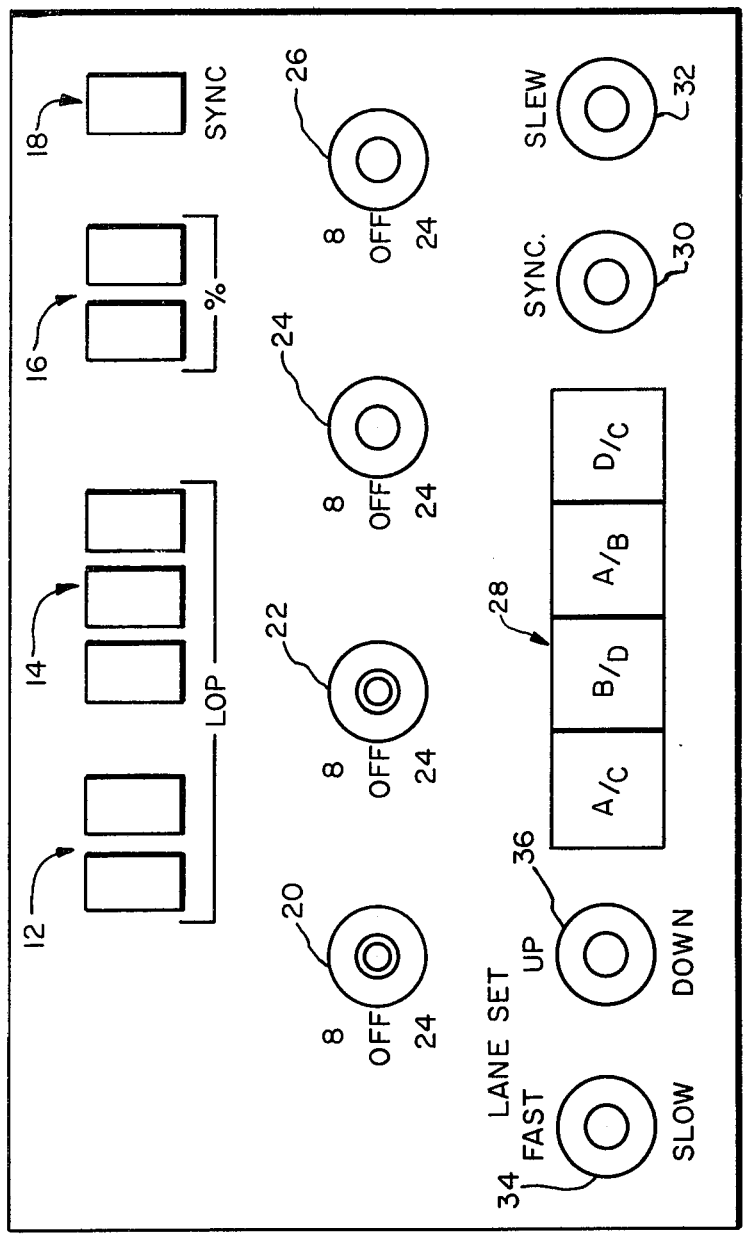
FIG. 1 is a presentation of the Omega receiver front panel.
Figure 3:
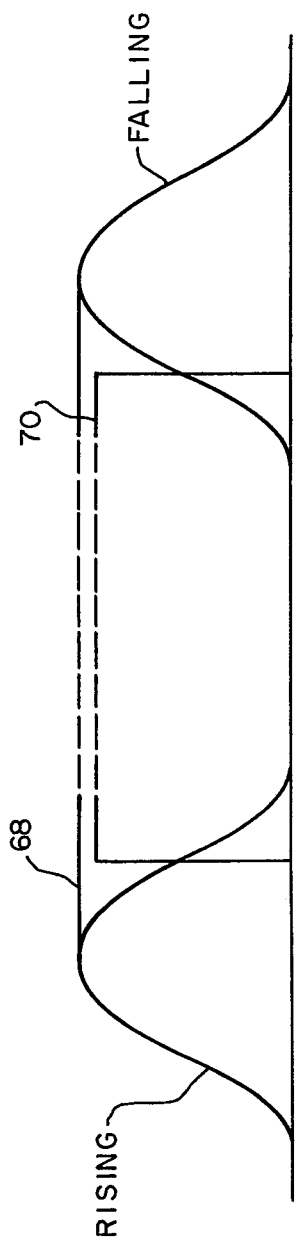
FIG. 3 is a signal waveform diagram useful in explaining the operation of a portion of the receiver for phase detection.
Figure 2:
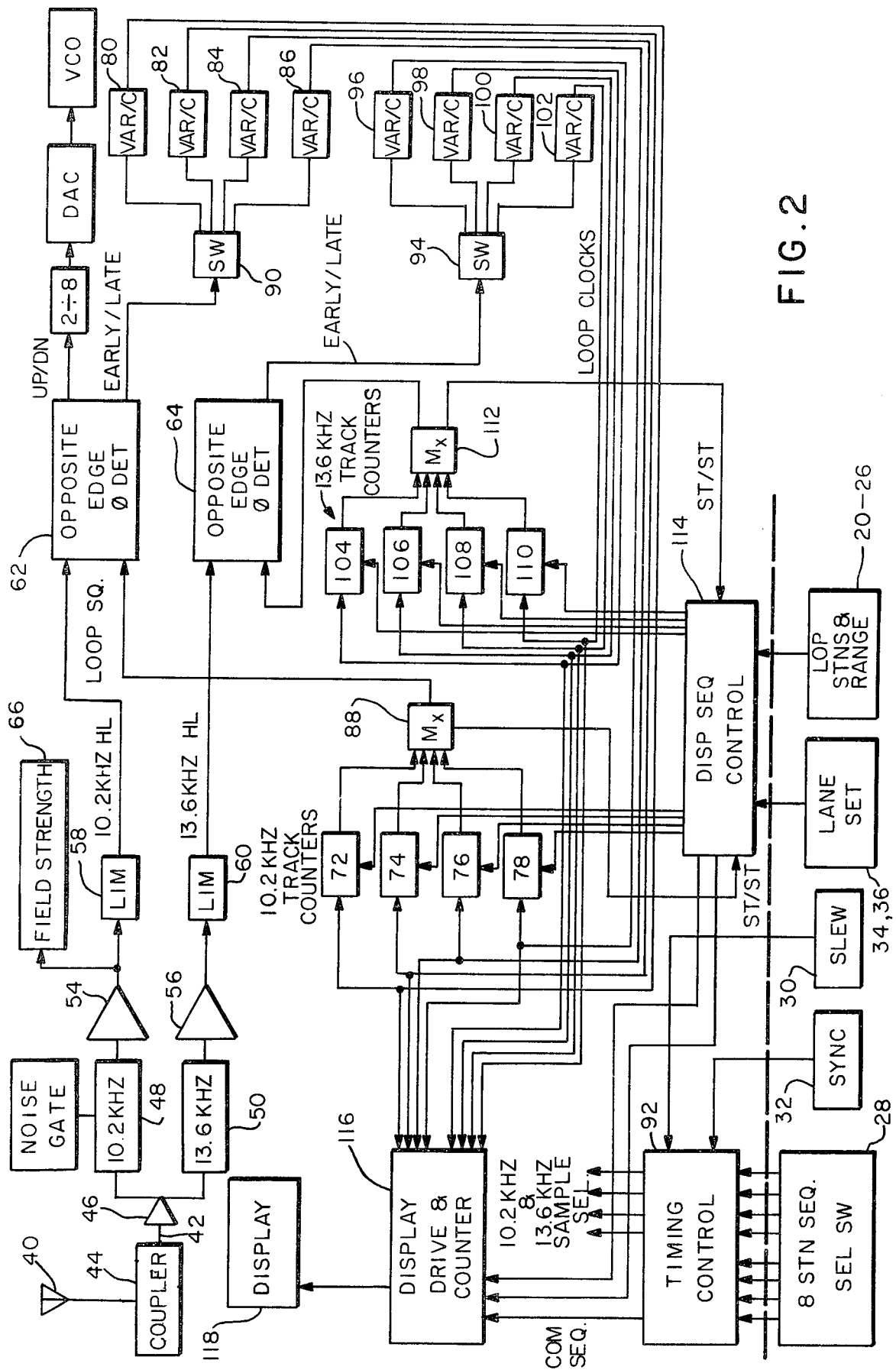
FIG. 2 is a block diagram of the overall receiver.

A full understanding of the operation and construction of an Omega navigation receiver according to the present invention may be obtained by reference to FIGS. 1–3 for a general overview of receiver operation, and FIGS. 4–12 for a complete view of receiver structure.

In FIG. 1, the receiver front panel is presented and affords a view of system features. At the top, digital displays 12, 14, 16 and 18 indicate LOP and synchronization information. Two digit display 12 indicates the two Omega stations for which an LOP is presented in the three digit lane display 14, and percent of distance between lanes shown in display 16. The two stations selected for phase difference representation are determined by switches 20, 22, 24, and 26 which select either 8 or 24-mile lanes for phase indication for a two-station pair selected in a corresponding pair of selector switches in the eight switch panel 28.

Initial synchronization of receiver timing to the received sequence of eight Omega stations (A-H) is achieved from use of the sync switch 30 and slew control 32. Switch 30 is depressed until the station in digit 18 is the selected station for synchronization (usually the strongest). Slew switch 32 is used to bring receiver timing and station transmission time as close as possible.

The lane set switches 34 and 36 permit fast or slow slewing of the lane LOP shown in digits 14 to the lane nearest the known location for at least three of the four two station pairs selected via switches 28. Omega phase maps for the location of the receiver are used for this purpose.

Actual receiver operation can now be viewed by reference to the general block diagram of FIG. 2 and the waveform diagram of FIG. 3. In FIG. 2, the 10.2 $KH_z$ and the 13.6 $KH_z$ Omega transmissions are gathered by an antenna 40, matched to a line 42 by a coupler 44 which conveys them to an amplifier 46 within the receiver. 10.2 KH$_z$ and 13.6 KH$_z$ filters 48 and 50, respectively, separate the two frequencies. A noise gate 52 blocks the signal from filter 48 in the absence of proper signals. Amplifiers 54 and 56 boost the outputs of filters 48 and 50 and respectively apply them to hard limiters 58 and 60 to provide hard limited 10.2 KH$_z$ and 13.6 KH$_z$ signals. It is a feature of this receiver that the hard limiting need not be so accurately performed as to prevent asymmetries in the hard limited squarewave because the respective phase detectors 62 and 64 operate to detect peak signal points independent of squarewave symmetry. A field strength indicator 66 provides a measure of relative Omega station signal strength to facilitate synchronization.

The features of the phase detectors 62 and 64 which provide accurate phase detection may be understood by reference to FIG. 3 showing rising and falling edges of a typical hard limited 10.2 KH$_z$ signal waveform 68 separated by several cycles and rising and falling edges of a 81.6 H$_z$ tracking loop squarewave signal 70 from one of four 10.2 KH$_z$ tracking loop counters 72, 74, 76 and 78, for the corresponding station. The phase detector, 62 in this case, provides an indication of whether opposite, falling and rising, edges of the received, hard limited signal occur early or late with respect to the lower frequency loop squarewave representative of loop synchronization with the corresponding received signal. The lower frequency provides sampling every 125th edge of the received signal to limit the effect of filter ringing. An odd harmonic is selected to insure rising and falling edge correspondence between received and loop signals. An early/late output signal is provided from the phase detector 62 for each edge of signal 70 to a corresponding one of four variable counters 80, 82, 84 and 86 to adjust the pulse rate provided by the appropriate counter to the corresponding tracking loop counter thereby to adjust its synchronization. An electronic multiplexer 88 selects the appropriate loop counter squarewave for application to the phase detector 62 and electronic switch 90 directs the early/late signal to the appropriate variable counter 80–86 Multiplexer 88 and switch 90 are controlled by a timing and control system 92 which is synchronized to the received station sequence using the synch and slew switches.

It is apparent that if the received squarewave has perfect symmetry this system for phase syynchronization will produce accurate synchronization of each tracking loop to the corresponding received signal. If, however, the received signal is asymmetrical, the tracking loops will synchronize to the received limited signal such that the early and late signals from rising edge comparisons equal the late early signals, respectively, for the falling edge comparisons. This will occur in the noise free case of asymmetry at any point where the detected rising and falling edges of the received signal span zero or an even number of edges in the loop signal 70 creating a phasing indeterminancy.

However, this ideal asymmetry does not occur in the real world, where noise variation in symmetry (a form of random width modulation) occurs on the real received signals. A typical distribution for the rising and falling edges in the presence of noise is shown in FIG. 3. As long as the noise variation in rising and falling edges exceeds the variations in these edges due to asymmetry produced by the signal limiter (as shown in FIG. 3), a significant percent of the time, the average phasing of the tracking loops will be synchronized to the average phasing of the received signals. The 81.6 H$_z$ edges will intercept the distribution curve at the same point and the 81.6 H$_z$ squarewave will be centered in all cases. The effects of both noise and asymmetry are then cancelled. As will be seen from the description below, the manner in which the tracking loops are synchronized insure an averaging of these effects.

It is apparent that by keying the early/late pulses to opposite edges of the received and hard limited signal, the effect of asymmetry in the limited signal is cancelled and in effect the peak point of the received cycles are detected.

For the purpose of tracking the 13.6 KH$_z$ hard limited signal, a similar tracking loop is employed using the output of the opposite edge phase detector 64, switch 94 and four sequentially selected variable count counters 96, 98, 100, 102, which in turn clock 13.6 KH$_z$ tracking loop counters 104, 106, 108 and 110. A multiplexer 112 directs the detection signal from the appropriate tracking loop counter 104–110 to the phase detector 64.

Slewing of the tracking loop counters 72, 74, 76, 78, 104, 106, 108 and 110 to the correct phase lane is achieved by the lane set controls through the display sequence controller 114. The switches 20–26 also operate through the display sequence controller 114 to operate the display drive and counter system 116 to select the appropriate two counters in the set 71–78 for display of the 8-mile lane phase difference in displays 12, 14 and 16 of display 118. A single digital differencer in system 116 provides a count corresponding to the phase difference between the selected 10.2 KH$_z$ loop counters for display in display 118. Where 24-mile lanes are employed, because of estimated position uncertainties, system 116 operates to effectively provide a digital difference corresponding to the phase difference of the difference frequency for the Omega 10.2 KH$_2$ and 13.6 KH$_z$ stations.

The timing and control system 92 provides overall system timing control by effectively assigning a loop counter and variable rate counter to each of the first four stations selected by switches 28. The last four selections must accordingly be taken from among the first four. All eight station selections control system 92 to gate appropriate counter pulses to phase detection and display elements.

Figure 4:
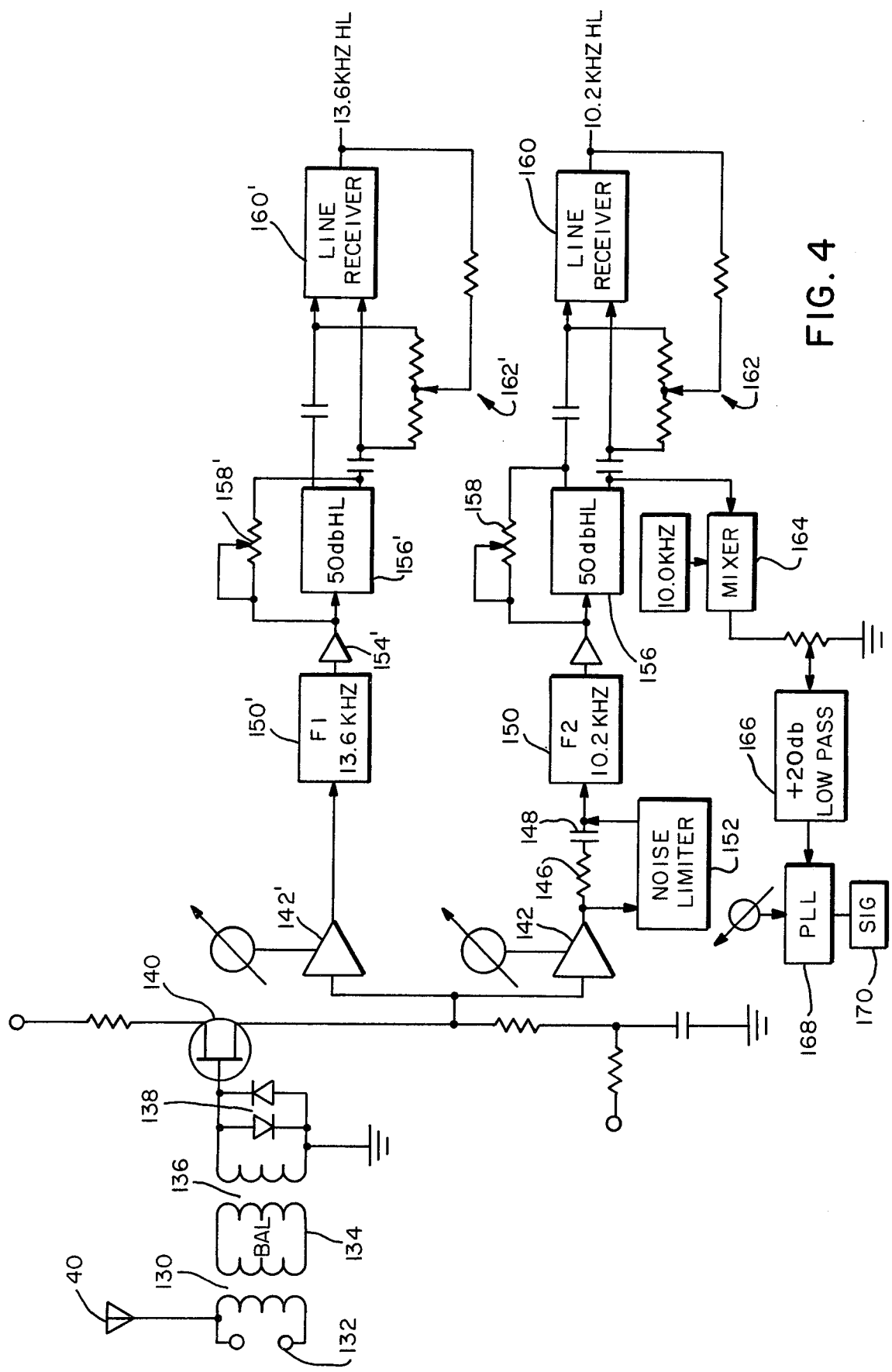
FIG. 4 is a more detailed presentation of the front end portion of the receiver.

The detailed implementation for this system may now be understood from the remaining figures. In FIG. 4, the RF "front end" of the receiver is shown and includes from antenna 40, a coupling transformer 130 with spark gap 132 for lightning protection. Antenna 40 drives a balanced line 134 and in turn a receiver transformer 136 having limiting diodes 138. An FET input stage 140 provides a high input impedance matching to amplifiers 142 and 142' for the 10.2 KH$_z$ and 13.6 KH$_z$ signal paths. The amplifier 142 is adjusted for peak gain at 10.2 KH$_z$ and its output is applied through resistor 146 and capacitor 148 to a 10.2 KH$_z$ crystal filter 150. A noise limiter 152 across resistor 146 and capacitor 148 detects preset noise levels and diverts the signal during their occurrence. The output of filter 150 is buffered by an amplifier 154 and applied to a 50 db gain, hard limiter 156 having a positive feedback path 158 to provide amplitude symmetry adjustment. A balanced output of the limiter is applied to a line receiver 160 having a feedback path 162 for higher level amplitude symmetry. The output of the line receiver 162 provides the 10.2 KH$_z$ HL (hard limited) signal.

The signal path for the 13.6 KH$_z$ signal is the same except for frequency differences and the absence of the noise limiter. The corresponding components of the 13.6 KH$_z$ path are designated by primes.

The 10.2 KH$_z$ output of the hard limiter 156 is mixed in mixer 164 with an internally generated 10 KH$_z$ signal to provide 200 H$_z$. A low-pass filter 166 passes the 200 H$_z$ to a phase-locked loop 168 for detection to provide an output signal representing coherent signal detection to an indicator 170.

The 10.2 KH$_z$ and 13.6 KH$_z$ HL signals are applied to the phase detector circuitry of FIG. 5. For simplicity, only the 10.2 KH$_z$ signal path is shown, an identical circuit being used for 13.6 KH$_z$ except for the differences attributable to frequency. In FIG. 5, the 10.2 KH$_z$ HL signal is applied to an exclusive OR gate 180 along with a tracking loop squarewave signal having a lower frequency squarewave in order to provide the operation illustrated and described above with respect to FIG. 3. The output signal from gate 180 will accordingly be an indication of early or late timing of the received Omega phase with respect to the internally generated phase represented by the selected tracking loop squarewave signal. The output of gate 180 is applied to a flip-flop 182 for storage and its outputs, which set the condition for advance and retard signals, are applied to a divide-by-16 counter 184 which is loaded to the mid-count by a start commutator signal at the beginning of each station transmission segment. The counter 182 is clocked through a delay circuit 186 by the 10.2 KH$_z$ second delay signal, the delay providing sufficient time for the signals to pass through to the counter in the normal processing. The last three bits from the counter 184 are decoded by a decoder circuit 188 to provide an indication of extreme counter states. The counter and decoder 184 and 188 thereby provide a digital filter to minimize the effect of small variations in the advance-retard signals. The all ones condition from the decoder 188 is applied to a NAND gate 190 along with the delayed clock from the delay circuit 186. The output of the NAND circuit 190 is applied to the clear input of a flip-flop 192. The clock input of flip-flop 192 is provided from a multiplexer 194, which receives the 10.2 KH$_z$ sample select signal described below to select the appropriate one of the particular station counter outputs described below. The output of the flip-flop 192 will accordingly be a first state when the phase detector detects normal phasing and in the second state when the phasing is either early or late. The output of flip-flop 192 is applied to a NAND gate 196 which has a further input the output of the flip-flop 182. The output of NAND gate 196 is in one state for early or normal condition and the opposite for late phasing condition. It is applied to a dual decoder 198 for application to a selected one of counters 200, 202, 204 and 206 to preload them to predetermined counts. The particular one of the counters 200–206 preloaded is selected by the same 10.2 KH$_z$ sample signals applied to multiplexer 194. The decoder 198 functions as a switch to direct the output of the NAND gate 196 to the appropriate counter preload input. The opposite state output of flip-flop 192 is also applied to the dual decoder 198. The two outputs from the decoder 198 to the counters 200–206 provide a preload of an eleven when normal phasing is detected to result in a divide-by-5 condition. When timing is detected as advanced, a 10 is preloaded into the appropriate counter causing a divide-by-6 which retards the tracking loop, and where the timing is detected as retarded a twelve is preloaded in the counter to result in a divide-by-4 and an advance of the tracking loop. Each output of the counters 200–206 is applied to the multiplexer 194 for selection of the appropriate 10.2 KH$_z$ signal for clocking the flip-flop 192. The 13.6 KH$_z$ circuits operate functionally in the same manner as that of the 10.2 KH$_z$ circuits.

It is to be noted that the circuitry described above provides an adjustment in a counting sequence provided at the output of the counters 200–206 which will be used to adjust the phase of the tracking loop counters described below. As a result of the particular techniques of detecting the phase relationship between a locally generated standard and the opposite edge transitions of the received Omega signals as explained above, the effect of asymmetry in the hard-limiting circuitry is eliminated. The counters 200–206 are clocked at 5.1 MH$_z$; the 13.6 KH$_z$ path counters at 6.8 MH$_z$.

The remaining circuitry of FIG. 5 is provided for the purpose of controlling the oscillator of the Omega receiver. For this purpose, the TC output of the counter 184 is applied through a divide-by-16 counter 208 to a preset jumper wire system to a divide-by-16 counter 210 in tandem with a second divide-by-16 counter system 212. A preset jumper wire module 214 between counters 208 and 210 is preset to provide one of the possible division states by counter 208 depending upon the voltage-to-frequency characteristics of the oscillator employed in the Omega receiver. The counters 210 and 212 are up-down counters and the up-down state is controlled by the output of the flip-flop 182 depending upon whether the detection is early or late. The counters 210 and 212 will thereby integrate the early or late phase error and provide a digital signal representative thereof to a digital-to-analog converter 216, the analog output of which is applied through an amplifier 218 to the VCO control input of the crystal voltage controlled oscillator 220 shown in FIG. 6. The amplifier 218 has an integration characteristic to provide additional filtering.

With regard to FIG. 6, the voltage controlled oscillator 220 and associated frequency division circuitry is shown. The oscillator 220 is adjusted to have a 10.2 MH$_z$ output. The output of the oscillator 220 after appropriate signal buffering to prevent effects from loading is applied through a divide-by-12 circuit 222. The divide-by-2 bit output is ANDed with the output of the oscillator 220 in a gate 224 to provide a 5.1 MH$_z$ output signal for the counters 200–206 in FIG. 5. A rate multiplier technique is employed with the divide-by-12 counter 222 to provide a 6.8 MH$_z$ signal for similar counters in the 13.6 KH$_z$ phase detector 64 shown in the block diagram of FIG. 2. For this purpose, two bits of the counter 222 are NANDed in a gate 226. The output of the NAND gate 226 is applied to an NOR gate 228 and its output is applied to a NAND gate 230. Other inputs to the gates 228 and 230 are respectively from the first bit of the divider 222 and from the output of the oscillator 220.

The output of the NAND gate 226 is applied as a clock input through a chain of two divide-by-16 counters 232 and 234 which are connected to provide a 10 KH$_z$ clock output and a 10 KH$_z$ squarewave used elsewhere in the system.

Figure 7:
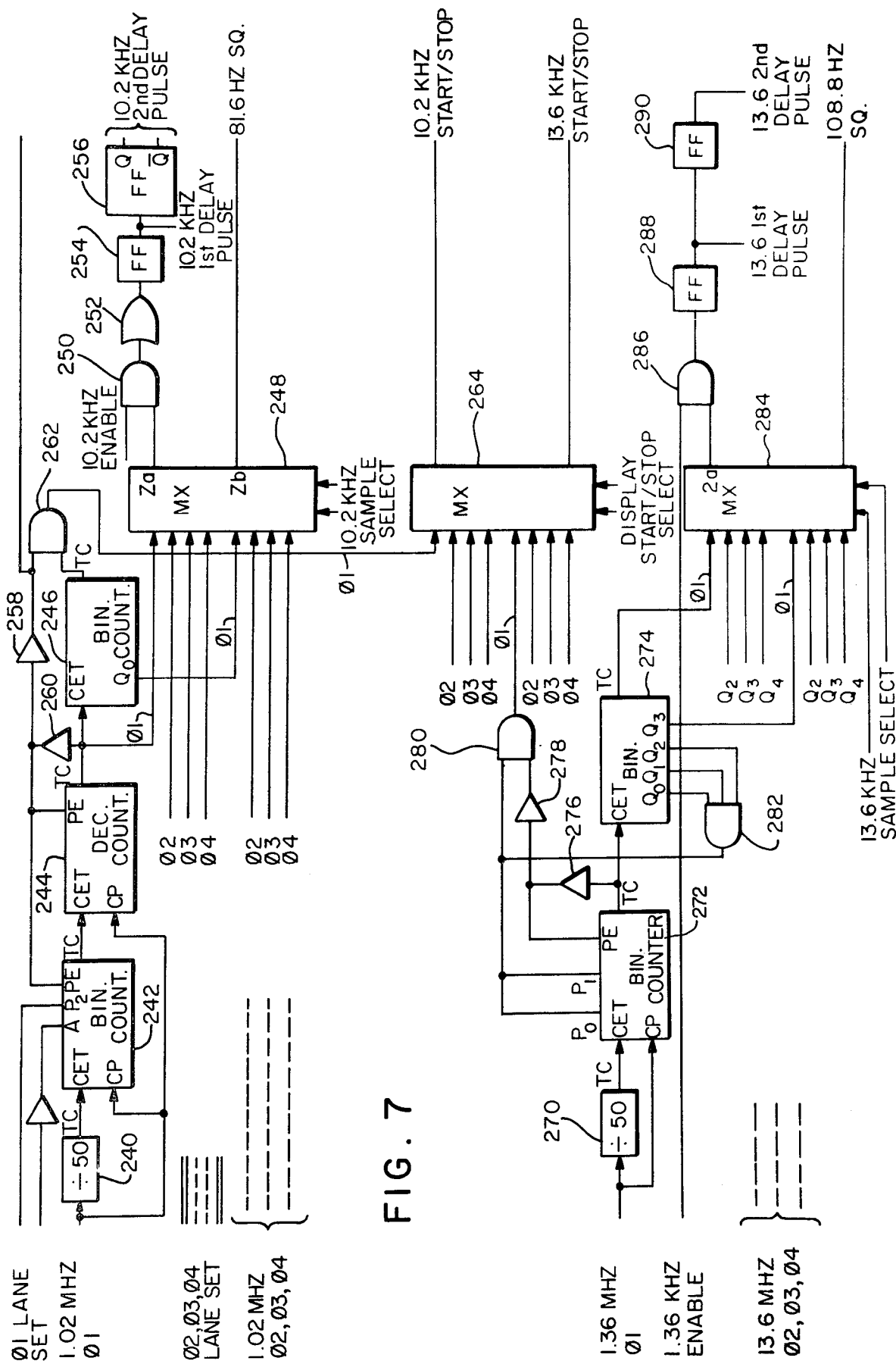
FIG. 7 is a detailed description of the tracking loop section of the receiver.

The tracking loops are shown in FIG. 7 and consist of eight counter-divider chains, four for the 10.2 KH$_z$ signal processing and four for the 13.6 KH$_z$ signal processing. In FIG. 7, one of each of the two different frequency signal processing tracking loop chains is illustrated, the other three for each frequency being identical. Each counter chain in the FIG. 7 circuitry tracks the respective four 10.2 KH$_z$ and 13.6 KH$_z$ stations transmissions selected by the front panel controls.

For the 10.2 KH$_z$ signal, each counter chain comprises a divide-by-50 counter 240 with its output applied to the CET input of a binary counter 242 which in turn has its TC output applied to the CET input of a decade counter 244. The TC output of the counter 244 is applied to the CET input of binary counter 246. The counter 240 is clocked by the 1.02 MH$_z$ output of the corresponding one of the counters 200–206 in FIG. 5. The counters 242 and 244 are connected together to provide a divide-by-125 count and counter 246 provides a divide-by-16 count. The counters 242 and 244 operate to provide the divide-by-125 function employing a parallel enable input to the counters 242 and 244 in response to the final output from counter 244 to set a divide-by-13 condition in counter 242 in the first cycle of that counter. The counter 244 is enabled for a divide-by-8. The total cycle count will be a divide-by-125 (one 13 and seven 16).

The counter 242 which adjusts the count function from a divide-by-125 to a divide-by-127 or divide-by-123, depending upon whether the lane is being changed up or down. Odd harmonics are used as explained above. A specific signal is applied to the counter 242 for this purpose by the display sequence controller discussed below in response to setting of the lane set front panel controls to either up or down and fast or slow set condition.

The output of a counter 244 is applied to one of a set of four inputs of a dual multiplexer 248 and its output is applied to an AND gate 250 along with the 10.2 KH$_z$ enable signals described below. Its output is applied through an OR gate 252 to a flip-flop 254 and serially to a second flip-flop 256. The signal from the output of flip-flop 254 provides the first 10.2 KH$_z$ delay pulse and the second flip-flop 256 provides the second delay pulse. The Q0 output of the counter 246 is applied to the first of a second set of four inputs of the dual multiplexer 248 and its output provides the 81.6 H$_z$ squarewave output signal applied to the exclusive OR gate 180. The multiplexer 248 receives similar signals on the remaining of each of the two sets of three signals from the other counter chains to select the appropriate counter chain for providing the outputs to the gate 250 and as the 81.6 H$_z$ squarewave output of the loop in response to the 10.2 KH$_z$ sample select signal applied to the multiplexer 248.

The output of the counter 246 at the TC terminal is applied to an AND gate 262 along with the output of an inverter 258 which receives the TC output of the counter 244 after an inverter 260. The inverter 260 provides the parallel enable signal for the counters 242 and 244. The output of the AND gate 262 is applied on one of four inputs to a dual multiplexer 264 and its output provides the start-stop signal for the 10.2 KH$_z$ signals.

The 13.6 KH$_z$ tracking loops are also represented in FIG. 7 in detail for one counter chain of the four. The 13.6 KH$_z$ loops are similar except that no lane set function is required since the 13.6 KH$_z$ signals are from the same stations and are used for differencing with the 10.2 KH$_z$ signals to provide a 24-mile lane where vessel position is not known with sufficient accuracy to permit use of the 8-mile lane. The 13.6 KH$_z$ loop includes a divide-by-50 counter 270, the TC output which is applied to a tandem connection of counters 272 and 274 to provide a divide-by-250 function. The TC output of the counter 272 is applied through an inverter 276 to the parallel enable input to provide the divide-by-250 function, essentially two cycles of the divide-by-125 function associated with the 10.2 KH$_z$ tracking loop. The inverted output (TC) of the counter 272 is again inverted by inverter 278 and applied as one input of an AND gate 280. The AND gate 280 receives on a second input the detected 8 and 16 count of the second counter 274 detected through an AND gate 282 from the three last significant outputs thereof. The AND gate 280 detects a divide-by-125 function of counter 272 and 274 and its output is applied to the first of a second set of four inputs of the multiplexer 264. Its output provides a 13.6 KH$_z$ start-stop signal. The multiplexer 264 is activated by a display start-stop select signal, to be described below, for selection of the appropriate one of each of the two sets of four inputs.

The TC output of the counter 274 is applied to the first of four inputs of a dual multiplexer 284 and the divide-by-2 output is applied to the first of a second set of four selectable inputs of the dual multiplexer 284. The first output of the multiplexer is applied to an AND gate 286 with the 13.6 KH$_z$ enable signal and its output applied to a chain of flip-flops 288 and 290 which provide respective outputs for the first and second 13.6 KH$_z$ delay pulses. The second output of the multiplexer 284 provides the 108.8 H$_z$ squarewave loop signals for use in the 13.6 KH$_z$ phase detector.

Figure 8:
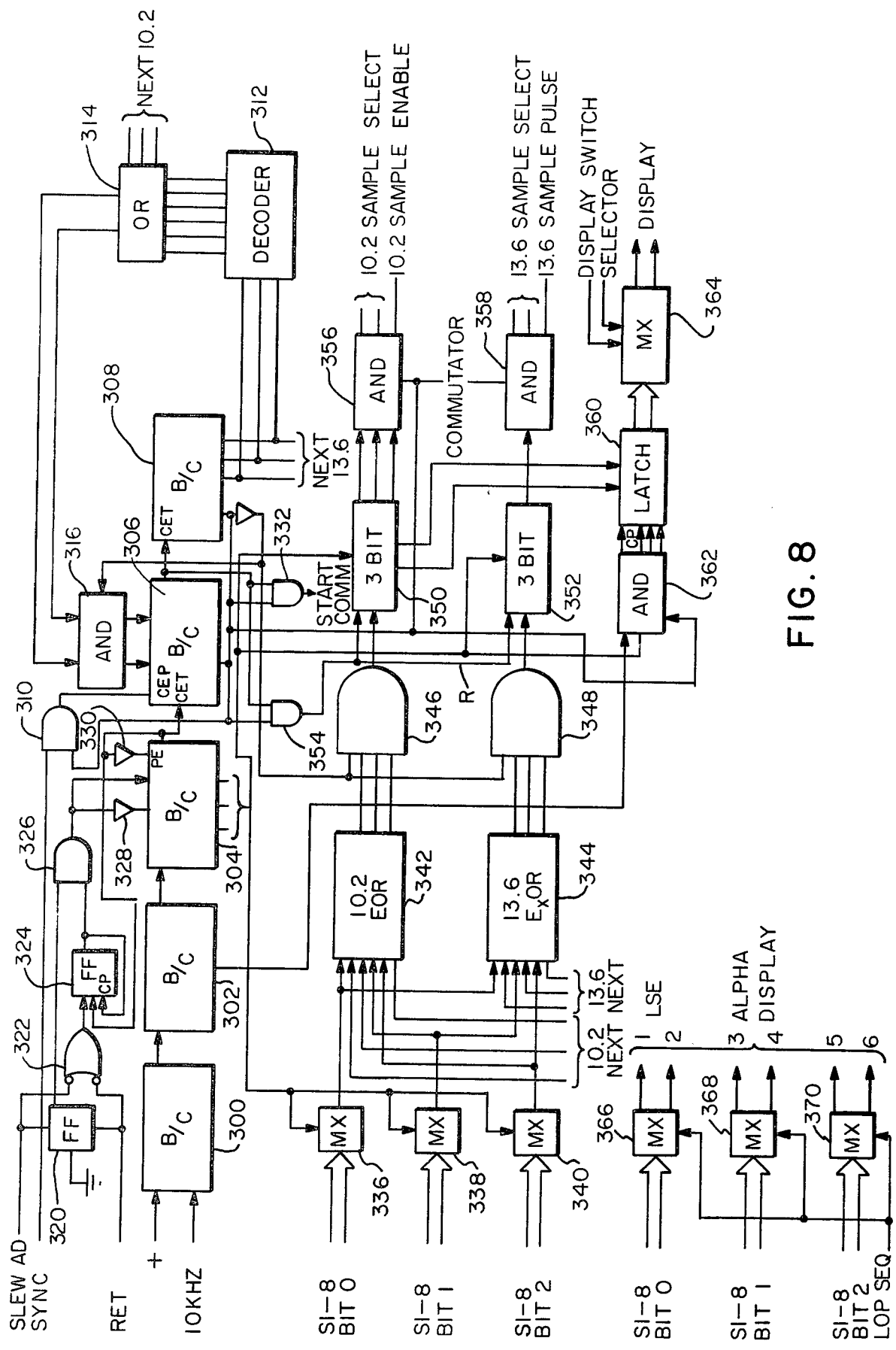
FIG. 8 is a detailed presentation of the timing and control portion of the receiver.
Figure 9:
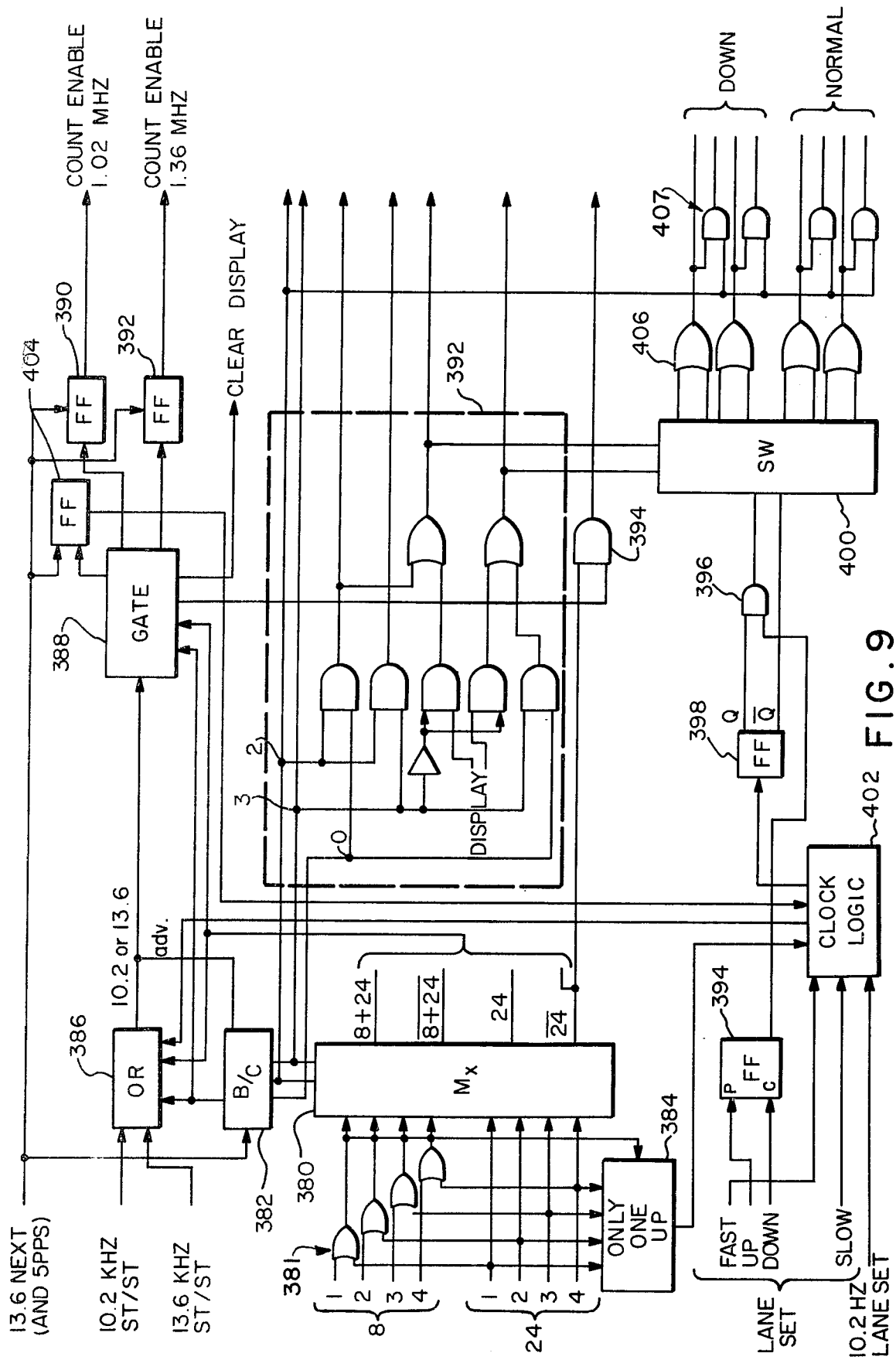
FIG. 9 is a detailed presentation of the display sequence control portion of the receiver.
Figure 10:
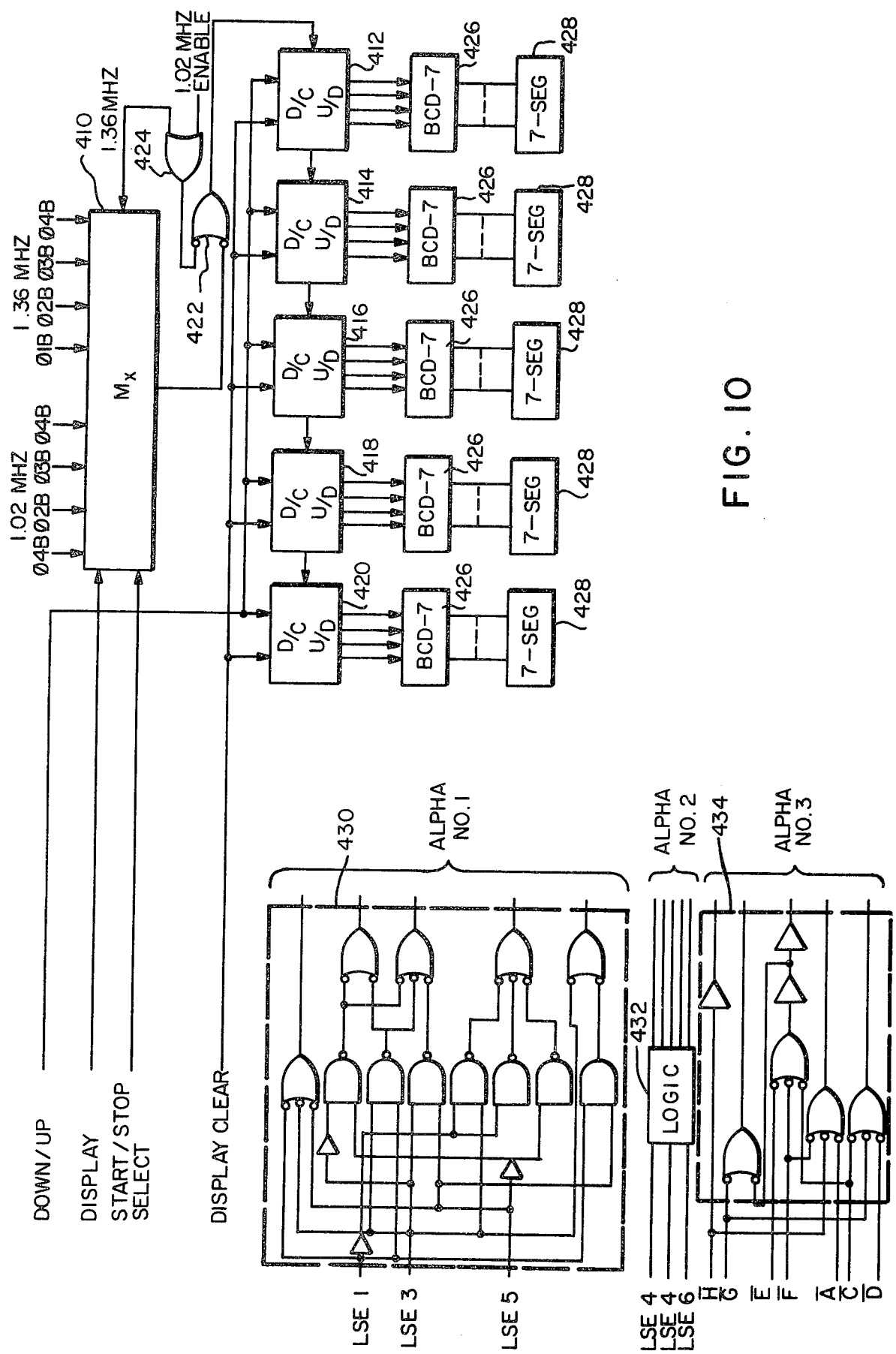
FIG. 10 is a detailed presentation of the display driver portion of the receiver.

With respect to the timing and control function of the Omega receivers specifically as represented by the timing and control system 92, display sequence controller 114 and display drive and counter 116 in the FIG. 2 block diagram, this circuitry is shown in detail in FIGS. 8–10. With respect to FIG. 8 in particular, the timing and control system 92 is shown in detail. The purpose of FIG. 8 timing and control logic is to provide timing output signals in response to selected station sequencing from the switches 28 in FIG. 2 so that the appropriate tracking loops are enabled at the corresponding time in the repeating sequence of time slots for the Omega station transmissions, as well as providing other acitivation signals for use throughout the Omega receiver. For this purpose, a counter chain composed of binary counters 300, 302, 304, 306 and 308 are provided and are clocked by the 10 KH$_z$ signal applied to the first counter 300 in the chain. The chain of counter 300–308 establishes a sequencing in the Omega station transmission cycle and various outputs are taken from the counter chain to be used throughout the system as will be explained below. Counter 304 cycles once each interval between transmissions by each station. Counter 306 cycles during transmission and counter 308 defines the station transmission sequence. The chain of counters 300–308 is manually set to the sequence of the received stations using the sync and slew switches 30 and 32 on the panel. For this purpose, the sync signal is applied through an AND gate 310 to the CEP input to the binary counter 306. The other input of the AND gate 310 is from the Q0 output of the last counter 308. The last three states of the output of the last counter 308 provide a set of signals defined as the NEXT 13.6 signal (a binary code for the next 13.6 $KH_z$ station in the eight station sequence) and these are also applied to a decoder 312 which provides sequential activation of eight independent signal lines which define the commutation sequence (COM/SEQ), one for each station. These eight signal lines are also applied to an OR network 314 which has one output defining the NEXT 10.2 signal (a three bit binary code for the NEXT 10.2 $KH_z$ station to transmit) as well as two outputs representing the existence of the B, C, D, F and B, D, E, H signals in the eight sequence commutation lines. This output is ANDed with the Q0 output from the counter 308 in the AND network 316 and applied to the first and second preload inputs, respectively, of the counter 306.

The function of the above circuitry is to cause the counters 300–308 to synchronize to a selected station when the sync switch 30 is depressed in conjunction with the display of the selected station designated in display 18 from the commutation sequence by display logic described below. Such operation will cause the counter 306 to stop counting. The sync switch is then released at the end of the display of signal reception in indicator 170 for that same station. The station selected for synchronization is usually the strongest in the area and thus easily identified in indicator 170. More accurate synchronization is achieved through the use of the slew switch 32 and the respective advance and retard signals provided by it. These are applied to set and reset inputs of flip-flop 320, and to inputs of an OR gate 322. The output of this OR gate is applied to the J input of a flip-flop 324 and its Q output is applied to the K input thereof as well as one input of an AND gate 326. The other input of the AND gate 326 is taken from the Q output of the flip-flop 320. The output of the AND gate 326 is applied to the higher order preload inputs of the counter 304 and through an inverter 328 to low order preload inputs. The TC output of the counter 304 is applied through an inverter 330 to the preload enable input of the same counter. The net result of this circuitry is to permit advancing or retarding of the counter chain 300–308 by changing the preload conditions in the counter 304 in response to the advanced or retarded position of the slew switch 32. This function permits mmore accurate synchronization of the chain of counters 200–308 to the transmission sequence through manual observation of displays 18 and 170.

The TC output of the counter 306 as well as the QO output of the counter 308 are ANDed in a gate 332 to provide at the output thereof the START COM signal used elsewhere in the circuitry. With the appropriate sequence of station transmissions now determined by the chain of counters 300–308, it is possible to activate appropriate portions of the Omega receiver at the time of reception of the station selected by the switch system 28. These switches are eight in number for selecting the two stations to be phased differenced in each of four possible phase differencing sequences which the receiver is capable of. Each of the eight switches has three bits associated with it which may be in either of two states. There is a unique three bit code for each station selected by each switch. The first, second and third bits for each of the eight switches are applied as eight inputs to respective multiplexers 336, 338 and 340 in the FIG. 8 timing system. The multiplexers 336–340 are sequenced to select all the eight switch inputs in response to the output of the counter 304 during the interval between station transmissions. The outputs of each of the multiplexers 336–340 (a three bit code for each station to which a switch is set) are applied to an exclusive OR network 342 for the 10.2 $KH_z$ signal path and to an exclusive OR network 344 for the 13.6 $KH_z$ signal path. In addition, the OR network 342 receives the NEXT 10.2 signal and the OR network 344 receives the NEXT 13.6 signal. The three outputs from each network 342 and 344 are applied to respective AND gates 346 and 348. Each output to an AND gate 346 and 348 represents the condition of exclusive ORing the output of corresponding multiplexers 336–340 with the corresponding one of the three lines in the NEXT 10.2 signal or NEXT 13.6 signal and thus activation of all three outputs indicates that the multiplexers 336–340 have an output code (station) agreeing with the next station transmission at 10.2 and 13.6 $KH_z$. The AND gates 346 and 348 also receive the inverted Q0 output of the counter 308 indicating a commutation interval (between stations). First and second three bit storage registers 350 and 352 for the 10.2 $KH_z$ and 13.6 $KH_z$ signal paths, respectively, are provided in order to store a code indication of the next station to transmit, if it has been selected by the switches 28. The J input of the first storage flip-flop in each register is loaded with the respective output of AND gates 346 and 348 and will accordingly indicate whether the succeeding station is one identified by the switch system 28 for use in phase measurement. The remaining two flip-flops in the three bit registers 350 and 352 have their J inputs provided from the Q1 and Q2 outputs of the counter 304, then defining a two bit code for the one first four states in the eight state counter 304 sequence corresponding to the switch which is set to the next station to transmit. The registers 350 and 352 are reset by the output of an AND gate 354 which receives the Q0 output and TC outputs of the counters 308 and 306 respectively. The three outputs of each flip-flop in each of the three bit registers 350 and 352 are applied to respective AND networks 356 and 358 where they are ANDed with the Q0 commutator signal output from the counter 308. The 10.2 sample enable and 13.6 sample enable signals are provided from the AND networks 356 and 358 in response to the first flip-flop in each of the registers 350 and 352 as ANDed by the respective gates in the networks 356 and 358 to indicate that a selected station is coming in the defined interval. The last two flip-flops in each of the registers 350 and 352 are applied to the AND network 356 and 358 to provide the 10.2 sample select and 13.6 sample select signals for use by the multiplexers 248 and 284 in FIG. 7, as well as elsewhere in the system. These thus define which of switches 28 and 20–26 correspond to the next station. The outputs in the last two flip-flops in the register 350 are also provided to an eight bit latch circuit 360, each flip-flop being directed to four alternate latches. Each latch is clocked by one of four outputs of an AND network 362 which responds to the Q0, Q1 and Q2 outputs of the counter 304 to select its last four states as well as the Q1 and Q2 outputs of the counter 302 and the commutator signal from the counter 308. The AND network 362 identifies the last four states of counter 304 and for each state loads a pair of corresponding latch circuits with the station code of the first four states when the same station was selected. Accordingly the latch 360 will store a code for the last four switch selections in system 18, thereby to identify the corresponding tracking loop. The output of each of the eight storage elements in the latch 360 is applied to a multiplexer 364 which is activated by a display switch selection input to provide four first and second outputs as a display command for the display sequence controller to be described below, enabling it to select the correct tracking loop.

In addition, the first, second and third bits for each of the eight switches in the system 28 are applied to the eight inputs of multiplexers 366, 368 and 370 in FIG. 8. The outputs of these multiplexers provide the alpha character display controls used in the display driver and are controlled by an LOP SEQ identification signal from the display sequence controller to be described below.

With reference to FIG. 9, the detailed circuitry implementation of the display sequence control function will be described. The function of the display sequence controller is to respond to the selection of an 8 or 24 mile lane request and LOP station identifications from range switches 20–26 to provide display control signals which insure that the display and associated counter are gated to the appropriate tracking loops for appropriate intervals. The display sequence controller of FIG. 9 also operates to gate the 10.2 KH$_z$ and the 13.6 KH$_z$ start-stop signals under control of the stations identified for each LOP and the range selection switches to appropriate 1.02 MH$_z$ and 1.36 MH$_z$ COUNT ENABLE control lines for the display counter of FIG. 10. For this purpose, the four signals from the four switches 20–26 indicating eight mile lane position selection for each of the four station pairs selected in the switching network 28 are applied through OR gates 381 to four inputs of a multiplexer 380. The similar four switches from the 24-mile lane contacts of the switches 20–26 are applied to a further set of four inputs of the multiplexer 380 as well as through the OR gates 381. The multiplexer 380 is controlled by the Q2 and Q3 outputs of a six bit binary counter 382 and provides four outputs which respectively are designated 8+24 and NOT 8+24, and 24 and NOT 24 for the apropriate switch conditions. The 24-mile lane signals as well as the outputs of the OR gates 381 are applied to a logic network 384 which provides an output signal indicating that one switch and only one switch has been selected and is used by the lane set logic described below. The counter 382 is controlled by the Q0, NEXT 13.6 signal which is applied to it for clearing and is advanced by the output of an OR network 386 which receives both the 10.2 KH$_z$ start-stop and the 13.6 KH$_z$ start-stop signals. The output of network 386 is provided as either the 10.2 or 13.6 start-stop signal in response to the states of the counter 382 applied to it as well as the outputs of the multiplexer 380 applied to it. This output advances the counter 382 and is applied to a gating network 388 which is also controlled by the counter 382 and multiplexer 380. The gating network 388 provides a display clear signal as well as loading corresponding flip-flops 390 and 392 from which the 1.02 MH$_z$ and 1.36 MH$_z$ count enable signals are respectively taken.

The effect of the networks 386 and 388 in conjunction with the counter 382 and multiplexer 380 is to set the flip-flop 390 to begin the 1.02 MH$_z$ counting in the display counter of FIG. 10 with the 10.2 KHZ start signal for the appropriaate station and to stop it with the disappearance of the 10.2 KHZ start-stop signal. Typically the start signal will be provided from multiplexer 264 in FIG. 7 for one station in a pair and the stop signal from the other station in the pair. The flip-flop 392 is similarly controlled with the 13.6 KHZ start-stop signal where a 24-mile lane designation has been shown through the switches 20–26. This results in the operation of the counter of FIG. 10 to provide in the case of 8 mile lanes a count up at 1.02 MH$_z$ during the interval between the start-stop signals of the two tracking loops whose difference in timing is measured for the corresponding LOP and for 24 mile lanes a countdown at 1.36 MH$_z$ for the interval between start-stop signals in the corresponding 13.6 KH$_z$ tracking loops.

Additional signals provided by the display sequence control system of FIG. 9 include the LOP SEQ signals provided from the Q2 and Q3 outputs of the counter 382 as well as the display switch selector signals and display start-stop select signals which are provided from a logic system 392 in response to the output states of counter 382 by the logic configuration shown in the diagram. The up-down control for the counter of FIG. 10 is provided as the output of an and gate 394 which receives the NOT 24 signal from multiplexer 380 as well as a signal from gate net work 388 to identify from 1.02 to 1.36 MH$_z$ counting.

The lane set controls at the bottom of FIG. 9 respond to the fast and slow and up and down signals from the lane set switches 34 and 36 to provide the down and normal signals as applied to the tracking loops in FIG. 7. For this purpose the up and down signals are applied to a flip-flop 395 which has one output to an and gate 396. The second output to the and gate 396 is provided from the Q output of a flip-flop 398. The $\bar{Q}$ output of flip-flop 398 as well as the output of and gate 396 are applied to a switching network 400 controlled by the display start-stop select signal to route the two signals to each of a corresponding one of two sets of four outputs described below. The fast and slow signals are applied through a clock logic system 402 along the a 102 H$_z$ lane set signal, the lane set enable signals and a five PPS signal which is ANDed with the next 13.6 Q0 signal and provided from a flip-flop 404 for the different rate lane set pulses applied to the switch 400.

A set of OR gates 406 responds to the outputs of the switch 400 in pairs. The first two ORed pairs providing the first and third phase selector signal, the second and fourth phase being provided from those respective signals ANDed in gates 407 with the first line of the LOP SEQ signal. The first and third phase and second and fourth phase signals for the normal range set control are provided in similar manner from the outputs of the second pair of OR gates 406 and second pair of and gates 407. This defines the outputs of the display sequence controller.

The final element of the receiver, the display driver and the single display counter are shown in FIG. 10. A multiplexer 410 receives on first and second sets of four inputs the 1.02 MH$_z$ signals for the four different stations selected from the 10.2 KH$_z$ channel counters of FIG. 5 and the 1.36 MH$_z$ phase B signals for these stations from the corresponding 13.6 KH$_z$ channel counters. The multiplexer 410 is also responsive to the 1.36 MH$_z$ enable signal for selecting between the two signal paths. The output of the multiplexer 410 is applied to the clock input of a chain of five decade counters 412, 414, 416, 418 and 420. The signal from multiplexer 410 is applied through an OR gate 422 which receives the output of an OR gate 424 that ORs the 1.36 MH$_z$ count enable and 1.02 MH$_z$ count enable signals. Since the gate 422 is an OR function and 424 is an OR function on the enable signals, a path in the output of multiplexer 410 is provided when one of the enable signals is present. The counters 412–420 are cleared by the display clear signal from FIG. 9 and are controlled for up or down counting by the up-down control signal also from FIG. 9 for counting up at 1.02 MHZ, for 8 mile lanes and counting up at 1.02 MHZ followed by counting down at 1.36 MHZ for 24 mile lanes. The display start-stop select defines which station loop to select.

Each of the decade counters 412–420 has a BCD-seven segments decoder 426 attached to its output and in turn each decoder 426 drives a corresponding seven-segment display for the percent of lane deviation in the last two digits 16 as well as the LOP lane in the most significant three digits 14.

For driving the first and second alpha numeric displays 12 as well as the synchronization display 18 alpha numeric drivers are provided as well. The first alpha designation in the display 12 is driven by the first, third and fifth LSE outputs of the alpha display from FIG. 8 through a decoding network 430 having typically logic as shown to provide five outputs for designating the eight alpha characters used for Omega station identification. A similar logic sequence 432 responds to the LSE 2, 4, and 6 signals from FIG. 8 to activate the corresponding second display element of the display 12 to designate the second of the stations selected for the phase difference and corresponding LOP. The output display for the sequence of display characters is driven by the COM/SEQ signals through further logic 434, as shown, to provide the output signals for driving the display 18.

Figure 11:
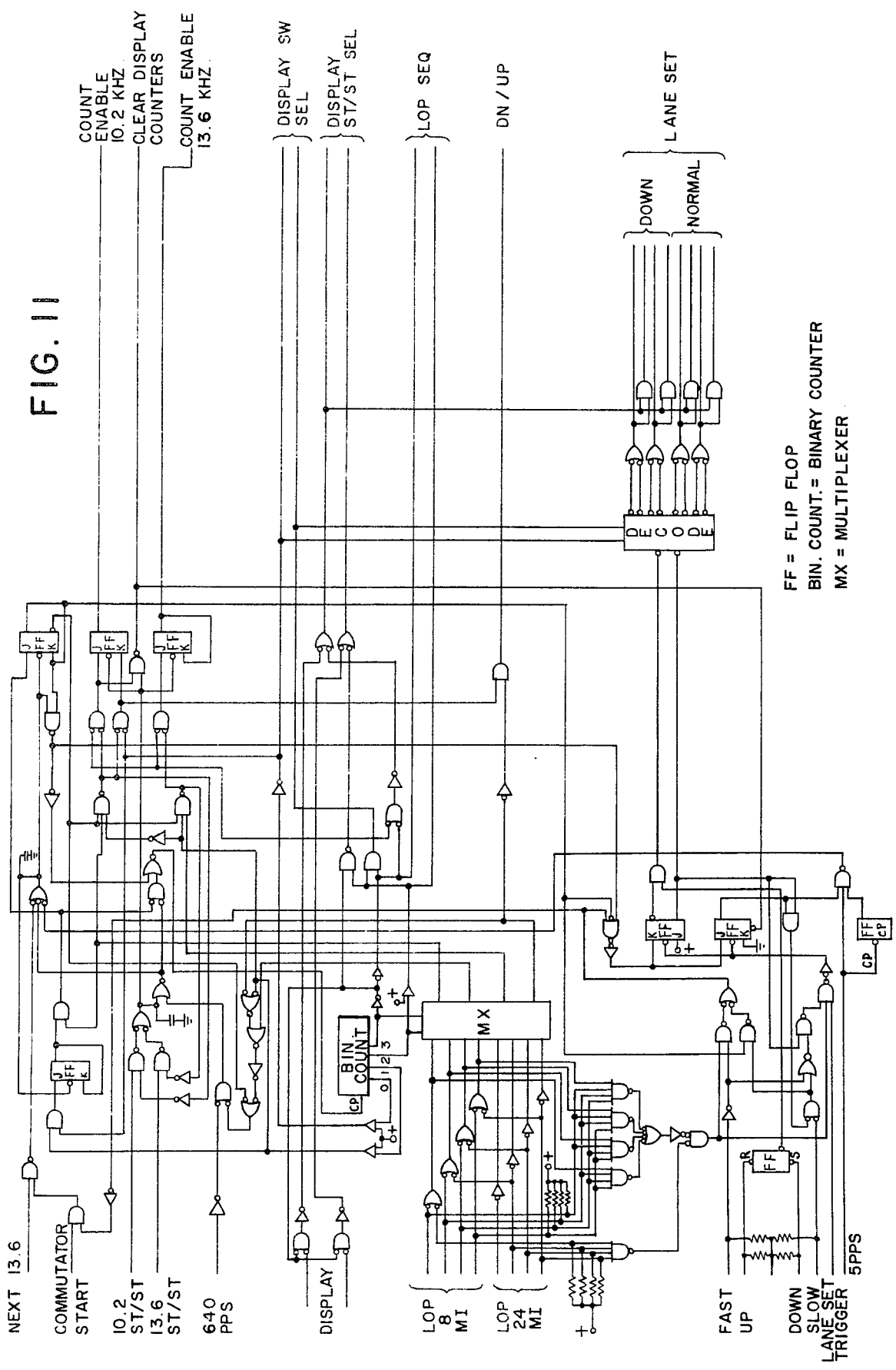
FIG. 11 is complete elemental implementation of the display sequence controller.

This ends the complete detailed description of the Omega receiver. However, for further clarity in understanding the specific construction of the elements employed for the display sequence controller of FIG. 9, a FIG. 11 is included as a specific, detail element by element implementation of the corresponding circuitry. Each of the logic networks is fully implemented and is positioned in the same corresponding portion of the drawing as in FIG. 9.

Having above described a full detailed system for providing a Omega navigation receiver according to the invention it will occur to those skilled in the art than other combinations or alternatives may be practiced within the spirit of the invention. Accordingly it is intended to limit the scope of the invention only as indicated in the following claims.

What is claimed is:

1. In a navigation receiver, a system for consistently phase synchronizing to a predetermined position of received navigation signals comprising:
   means for receiving navigation signals to provide a first signal having a plurality of cycles;
   means for generating a second signal having a plurality of cycles which are adjustable in phase in response to a control;
   means for detecting relative timing between a predetermined point on said second signal and a predetermined point on said first signal on a first slope thereof to provide a first early/late signal indicative of relative timing and for detecting relative timing between a further predetermined point on said second signal and a further predetermined point on said first signal on a second slope thereof opposite to said first slope to provide a second early/late signal indicative of relative timing; and
   means for developing said control in response to said first and second early/late signals to produce an adjustment of the phase of said second signal representative of each said early/late signal in which said first and second signals are synchronized with the predetermined and further predetermined points on said second signal having a set relationship to said predetermined and further predetermined points on said first and second slopes of said first signal.

2. The synchronizing system of claim 1 wherein said first signal is a noisy, asymmetrical, limited signal.

3. The synchronizing system of claim 1 wherein said second signal has a substantially longer period than said first signal to limit the detection of effects from a single disturbance in said first signal.

4. The synchronizing system of claim 3 wherein said first and second signals are generally related by an odd harmonic relationship.

5. The synchronizing system of claim 1 wherein said predetermined points of first and second slopes are rising and falling edges of said first signal.

6. In an Omega navigation receiver, a system for synchronizing an internally generated signal to received Omega broadcasts including:
   means for receivingg Omega braodcasts to provide a generally asymmetrical, hard limited signal for each received station with noise variations in the rising and falling edges thereof having a distribution which exceeds the variations in said edges due to asymmetry;
   A plurality of tracking loops each asociated with an Omega station broadcast and one of said internally generated signals with a substantially longer period than said hard limited signal, the period of said hard limited signal being an odd harmonic of said internally generated signal period;
   means for comparing a plurality of falling edges of said hard limited signal for each uninterrupted Omega station broadcast with a predetermining point of the internally generated signal from a corresponding tracking loop to develop a plurality of first control signals indicating the relative timing of each falling edge with respect to the predetermined point, and for comparing a plurality of rising edges of said hard limited signal in alternating sequence with the compared falling edges for each uninterrupted Omega station broadcast with a further predetermined point of that internally generated signal to develop a plurality of second control signals indicating the relative timing of each rising edge with respect to the further predetermined point; and means for controlling each tracking loop to adjusting the phasing of each corresponding internally generated signal in response to each corresponding first and second control signal whereby the corresponding hard limits signals and internally generated signals become synchronized with the predetermined and further predetermined points of the internally generated signal separated from respective falling and rising edges of said hard limited signal by substantially equal time intervals.

* * * * *

UNITED STATES PATENT AND TRADEMARK OFFICE
CERTIFICATE OF CORRECTION

PATENT NO. : 3,950,752
DATED : November 19, 1975
INVENTOR(S) : Harold P. Zitzow; Alan C. Marshall It is certified that error appears in the above-identified patent and that said Letters Patent are hereby corrected as shown below:

Column 4, line 32, "71-78" should read --72-78--.

Column 5, line 34, "182" should read --184--.

Column 7, line 28, "one 13 and seven 16" should read --one thirteen and seven sixteens--.

Column 8, line 51, "acitivation" should read --activation--.

Column 9, line 47, "mmore" should read --more--.

Column 11, line 67, "appropriaate" should read --appropriate--

Column 12, line 24, "identify from" should read --identify the shift from--.

Column 14, line 30, "receivingg" should read -- receiving --.

Signed and Sealed this

Fifth Day of October 1976

[SEAL]

Attest:

RUTH C. MASON
Attesting Officer

C. MARSHALL DANN
Commissioner of Patents and Trademarks